(12) United States Patent  (10) Patent No.: US 8,253,061 B2
Nowak et al.  (45) Date of Patent: Aug. 28, 2012

(54) HYBRID LASER ARC WELDING PROCESS AND APPARATUS

(75) Inventors: Daniel Anthony Nowak, Greenville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 12/831,680

(22) Filed: Jul. 7, 2010

(65) Prior Publication Data

US 2012/0006795 A1    Jan. 12, 2012

(51) Int. Cl.
    *B23K 26/04* (2006.01)
(52) U.S. Cl. ......... 219/121.63; 216/121.64; 216/121.76; 216/136; 216/137 R
(58) Field of Classification Search ............. 219/121.63, 219/121.64, 121.76, 136, 137 R
    See application file for complete search history.

(56) References Cited

U.S. PATENT DOCUMENTS

| 5,869,805 A * | 2/1999 | Beyer et al. ............... 219/121.83 |
| 2002/0195432 A1* | 12/2002 | Sekiguchi ................ 219/121.64 |
| 2010/0243621 A1 | 9/2010 | Nowak |

* cited by examiner

*Primary Examiner* — Minh-Loan T Tran
(74) *Attorney, Agent, or Firm* — Ernest G. Cusick; Gary M. Hartman; Domenica N. S. Hartman

(57) ABSTRACT

A welding method and apparatus for welding workpieces together by conducting a forward hybrid welding process on a joint region that includes a weld seam defined by and between faying surfaces of the workpieces, and then conducting an aft hybrid welding process on the joint region. The forward hybrid welding process simultaneously causes a forward laser beam and a forward electric arc to travel along the joint region, which in combination penetrates the weld seam and forms a weld pool that solidifies to form a weldment. The aft hybrid welding process utilizes an aft electric arc and an aft laser beam to produce a second weld pool that remelts and mixes with the weldment. On cooling, a weld joint is formed that is capable of deeply penetrating the weld seam of the joint region.

20 Claims, 1 Drawing Sheet

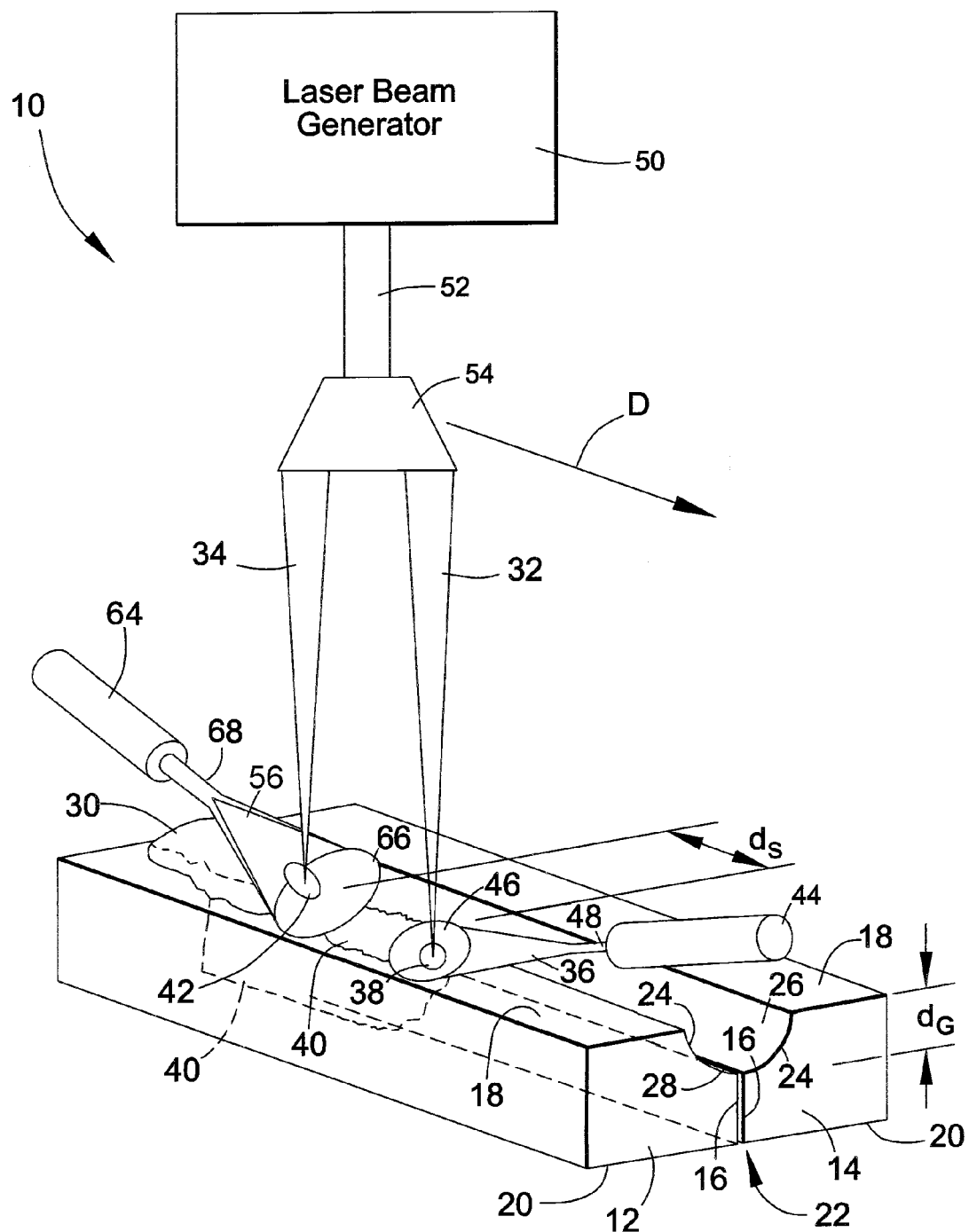

HYBRID LASER ARC WELDING PROCESS AND APPARATUS

BACKGROUND OF THE INVENTION

The present invention generally relates to welding methods. More particularly, this invention is directed to a welding process that utilizes a first hybrid laser arc welding technique in which laser beam welding and arc welding simultaneously occur in the same weld pool, and further utilizes a second hybrid laser arc welding technique that follows the first hybrid laser arc welding technique to promote the elimination of porosity and gas pockets in the resulting weld joint.

Low-heat input welding processes, and particularly high-energy beam welding processes such as laser beam and electron beam welding (LBW and EBW, respectively) operated over a narrow range of welding conditions, have been successfully used to produce crack-free weld joints in a wide variety of materials, including but not limited to alloys used in turbomachinery. An advantage of high-energy beam welding processes is that the high energy density of the focused laser or electron beam is able to produce deep narrow welds of minimal weld metal volume, enabling the formation of structural butt welds that add little additional weight and cause less component distortion in comparison to other welding techniques, such as arc welding processes. Additional advantages particularly associated with laser beam welding include the ability to be performed without a vacuum chamber or radiation shield usually required for electron beam welding. Consequently, laser beam welding can be a lower cost and more productive welding process as compared to electron beam welding.

Though filler materials have been used for certain applications and welding conditions, laser beam and electron beam welding processes are typically performed autogenously (no additional filler metal added). The high-energy beam is focused on the surface to be welded, for example, an interface (weld seam) between two components to be welded. During welding, the surface is sufficiently heated to vaporize a portion of the metal, creating a cavity ("keyhole") that is subsequently filled by the molten material surrounding the cavity. A relatively recent breakthrough advancement in laser beam welding is the development of high-powered solid-state lasers, which as defined herein include power levels of greater than four kilowatts and especially ten kilowatts or more. Particular examples are solid-state lasers that use ytterbium oxide ($Yb_2O_3$) in disc form (Yb:YAG disc lasers) or as an internal coating in a fiber (Yb fiber lasers). These lasers are known to be capable of greatly increased efficiencies and power levels, for example, from approximately four kilowatts to over twenty kilowatts.

Hybrid laser arc welding (HLAW), also known as laser-hybrid welding, is a process that combines laser beam and arc welding techniques, such that both welding processes simultaneously occur in the same weld pool. The laser beam is typically oriented perpendicular to the surfaces to be welded, while the electric arc and filler metal of the arc welding process (for example, gas metal arc welding (GMAW, also known as metal inert gas (MIG) welding) or gas tungsten arc welding (GTAW, also known as tungsten inert gas (TIG) welding) are typically positioned behind (aft) and angled forward toward the focal point of the laser beam on the weld joint surfaces. This aft position of the arc welding process is also referred to as a "forehand" welding technique. The benefit of the HLAW process is the ability to increase the depth of weld penetration and/or increase productivity by increasing the welding process travel speed, for example, by as much as four times faster than conventional arc welding processes.

Even though laser beam welding is known to have the various benefits noted above, deep penetrating laser beam welding techniques are known to be prone to trapped porosity. This propensity can be attributed to the low heat input associated with laser beam welding compared to typical fusion arc processes. As a result, the weld pool produced by laser beam welding tends to freeze very quickly, trapping gas-metal reaction products generated during the welding process. Though the inclusion of an arc process in HLAW processes helps to reduce porosity in shallow welds, for example, weld depths of less than one-half inch (about one centimeter), porosity resulting from trapped gas bubbles is an issue when attempting to achieve greater weld depths.

Reducing or eliminating porosity in deep laser welds would be particularly advantageous from the standpoint of achieving longer lives for components subjected to cyclic operations. One commercial example is the fabrication of wind turbine towers. Currently the use of welding processes that utilize a laser beam welding technique has been discouraged because of the propensity for large amounts of fine-sized internal porosity found in deep weldments produced by laser beam welding. The presence of porosity can significantly reduce the fatigue life of a weld joint and, therefore, a structure that contains the weld joint. Consequently, other welding techniques such as submerged arc welding (SAW) processes are more typically employed in the fabrication of structures subjected to cyclic operations, such as wind turbine towers. However, when used to weld large thick sections required in the construction of wind turbine towers, a significant drawback of the SAW process is low productivity, for example, resulting from the necessity to perform multiple passes at relatively low speeds, for example, about twenty to forty inches (about 50 to 100 cm) per minute. Though preheating the components just prior to welding might achieve a lower cooling rate to allow gas bubbles to escape the weld pool, in practice a component may require being heated to nearly three-quarters of its melting temperature, which is both expensive and can have deleterious effects on the base material properties of the component. Following laser beam welding with a second laser beam welding treatment to release the gas bubbles has also proven to be ineffective, since the weld pool produced by the second treatment also tends to freeze too quickly to allow gas bubbles to float free of the weld pool.

BRIEF DESCRIPTION OF THE INVENTION

The present invention provides a welding method and apparatus that utilize multiple hybrid laser arc welding techniques, each simultaneously utilizing laser beam welding and arc welding to produce a weld pool. A first of the hybrid laser arc welding techniques is followed by a second hybrid laser arc welding technique, which serves to promote the elimination of porosity and gas pockets in the resulting weld joint. The method is particularly well suited for welding relatively thick sections, for example, greater than one centimeter, that are otherwise difficult to weld using conventional hybrid laser arc welding techniques without resulting in excessive weldment porosity levels.

According to one aspect of the invention, the welding method involves placing workpieces together so that faying surfaces thereof face each other and a joint region is defined. The joint region comprises an intersurface portion defined by and between the faying surfaces and immediately adjacent surfaces of the workpieces that remain exposed after the workpieces are placed together. Forward and aft hybrid welding processes are then conducted in sequence along the joint region. The forward hybrid welding process comprises projecting a forward laser beam onto the joint region to cause a projection of the forward laser beam to travel along the joint region and penetrate the intersurface portion of the joint region, and further comprises directing a forward electric arc onto the projection of the forward laser beam while feeding a first weld filler material into the forward electric arc to form a forward weld pool that solidifies to form a weldment in the joint region. The aft hybrid welding process comprises projecting an aft laser beam onto the weldment to cause a projection of the aft laser beam to travel along and penetrate the weldment, and further comprises directing an aft electric arc onto the projection of the aft laser beam while feeding a second weld filler material into the aft electric arc to form an aft weld pool. The forward and aft laser beam projections are spaced apart along the joint region and the forward and aft electric arcs are spaced apart along the joint region so as to cause the aft weld pool formed by the aft hybrid welding process to cascade onto, remelt and intermix with the weldment to form a combined weld pool. The combined weld pool is then cooled to form a weld joint within the joint region that metallurgically joins the workpieces to yield a welded assembly.

According to another aspect of the invention, the welding apparatus includes means for welding the workpieces together by performing forward and aft hybrid welding processes in sequence along the joint region. The welding means comprising means for conducting the forward hybrid welding process on the joint region and means for conducting the aft hybrid welding process on a weldment formed by the forward hybrid welding process. The forward hybrid welding process means is adapted to project a forward laser beam onto the joint region and cause a projection of the forward laser beam to travel along the joint region and penetrate the intersurface portion of the joint region. The forward hybrid welding process means is further adapted to direct a forward electric arc onto the projection of the forward laser beam while feeding a first weld filler material into the forward electric arc to form the weldment in the joint region. The aft hybrid welding process means is adapted to project an aft laser beam onto the weldment and cause a projection of the aft laser beam to travel along and penetrate the weldment. The aft hybrid welding process means is further adapted to direct an aft electric arc onto the projection of the aft laser beam while feeding a second weld filler material into the aft electric arc to form an aft weld pool. The welding means spaces the forward and aft laser beam projections apart along the joint region and spaces the forward and aft electric arcs apart along the joint region so as to cause the aft weld pool formed by the aft hybrid welding process means to cascade onto, remelt and intermix with the weldment to form a combined weld pool.

According to a preferred aspect of the invention, the aft hybrid welding process serves to remelt and mix with the weldment formed by the forward hybrid welding process and thereby promote the elimination of porosity trapped in the deep-penetrating weldment produced by the laser beam of the forward hybrid welding process. Such a capability is particularly advantageous when attempting to produce relatively deep weld joints, for example, one centimeter and more. In so doing, advantages of deep-penetrating laser beam welding become available for a variety of products, including but not limited to power generation, aerospace, infrastructure, medical, and industrial applications, an example of which is the construction of wind turbine towers.

Other aspects and advantages of this invention will be better appreciated from the following detailed description.

BRIEF DESCRIPTION OF THE DRAWINGS

FIG. 1 is a schematic representation of two workpieces abutted together and undergoing a multistage welding process in accordance with an embodiment of the present invention.

DETAILED DESCRIPTION OF THE INVENTION

FIG. 1 represents a welding apparatus 10 for conducting a welding process that utilizes multiple hybrid laser arc welding processes. The hybrid laser arc welding processes are performed in sequence, with a first of the processes preferably yielding a relatively deep-penetrating weldment that can be rendered essentially free of porosity as a result of a subsequent hybrid laser arc welding process. The welding process is particularly well suited for fabricating components that require welding at relative thick sections, for example, one centimeter or more, as is the case for fabricating various components used in power generation applications, including the construction of wind turbine towers, as well as components intended for a wide variety of other applications, including aerospace, infrastructure, medical, industrial applications, etc.

FIG. 1 represents a pair of workpieces 12 and 14 undergoing a multistage welding process of this invention. The workpieces 12 and 14 may be castings, wrought, or powder metallurgical form, and may be formed of a variety of materials, nonlimiting examples of which include nickel-based, iron-based alloys, cobalt-based, copper-based, aluminum-based, and titanium-based alloys. The workpieces 12 and 14 have faying surfaces 16 desired to be metallurgically joined by a weld joint 30. The faying surfaces 16 are contiguous with oppositely-disposed first and second surfaces 18 and 20 of the workpieces 12 and 14, between which the through-thickness of each workpiece 12 and 14 is defined.

In FIG. 1, the workpieces 12 and 14 are shown placed together so that their faying surfaces 16 face each other. A joint region 22 is identified as defined by the faying surfaces 16 as well as by immediately adjacent surface portions 24 of each workpiece surface 18. These surface portions 24 are juxtaposed as a result of the manner in which the workpieces 12 and 14 have been mated. FIG. 1 shows the surface portions 24 as being defined within a weld prep in the form of a groove 26 sized to accommodate filler metal deposited during the hybrid laser arc welding process, as discussed below. The weld prep groove 26 is represented as having a U-shaped cross-section, though other cross-sectional shapes are also within the scope of the invention. Though the weld prep groove 26 could be eliminated in some applications, it will become apparent that a relative deep weld prep groove 26 is preferred to accommodate amounts of weld filler metal that can and are preferably used when performing the welding process of this invention. FIG. 1 further shows a shim 28 placed between the faying surfaces 16 of the workpieces 12 and 14. The shim 28 can be utilized to provide fill metal for the weld joint 30, and/or provide additional benefits as described in U.S. patent application Ser. No. 12/415,305, namely, stabilizing the weld keyhole to reduce spattering and discontinuities during high-powered laser beam welding. For this purpose, the shim 28 is shown as larger than the faying surfaces 16 so that the upper edge of the shim 28 protrudes from between the workpieces 12 and 14. Suitable and preferred compositions for the shim 28 will depend on the compositions of the workpieces 12 and 14.

According to a particular aspect of the invention, the through-thickness of the joint region 22 (generally normal to the surface portions 24) can be one centimeter (about 0.5 inch) or more. Though such thicknesses have previously proven to be an impediment to the use of high-powered laser beams and conventional hybrid laser arc welding processes as a result of the former's propensity for gas entrapment and the latter's inability to avoid gas entrapment in deep weld joints, the present invention overcomes problems of the prior art through the use of multiple hybrid laser arc welding processes that enable gases entrapped by laser beam welding that occurs during a first hybrid laser arc welding process to be released during a second hybrid laser arc welding process that immediately follows the first. For convenience, the hybrid laser arc welding processes will be referred to simply as hybrid welding processes, though it should be understood that each entails the combined use of a laser beam and an electric arc welding technique.

In FIG. 1, the means for carrying out a first "forward" hybrid welding process is represented as a "forward" laser beam 32 and a "forward" electric arc 36. The forward laser beam 32 is shown as being projected onto the joint region 22 and shim 28 to define a projection 38 on the surface portions 24 of the joint region 22. The projection 38 is caused to travel in a direction "D" along the joint region 22. FIG. 1 represents the forward laser beam 32 as penetrating essentially the entire weld seam, which is generally defined by an intersurface region of the joint region 22 between the faying surfaces 16. As such, the forward laser beam 32 preferably penetrates essentially the entire through-thickness of the workpieces 12 and 14 and their joint region 22. The electric arc 36 also travels to the joint region 22, defining a projected weld zone 46 that overlaps the projection 38 of the forward laser beam 32. More particularly, the weld zone 46 of the arc 36 is preferably larger than and completely surrounds the projection 38 of the beam 32. FIG. 1 further represents the arc 36 as emanating from an electrode, which is represented as a filler metal wire 48 fed into the arc 36 from a wire feed device 44, such as a spool. The weld zone 46 of the arc 36 and the projection 38 of the forward laser beam 32 are both caused to simultaneously travel, preferably in unison, in the direction "D" along the joint region 22.

FIG. 1 represents the means for carrying out the second "aft" hybrid welding process as comprising an "aft" laser beam 34 and an "aft" electric arc 56. The aft laser beam 34 is shown as being projected onto a weldment 40 formed by the forward laser beam 32 and electric arc 36, defining a projection 42 on the surface of the weldment 40 that may but does not necessarily penetrate the through-thickness of the joint region 22. As with the forward hybrid welding process, the electric arc 56 defines a projected weld zone 66 that overlaps the projection 42 of the aft laser beam 34. More particularly, the weld zone 66 of the arc 56 is preferably larger than and completely surrounds the projection 42 of the beam 34. FIG. 1 further represents the arc 56 as emanating from a second filler metal wire 68 fed into the arc 56 from a wire feed device 64, such as a spool. As with the laser beam projection 38 and electric arc weld zone 46 of the forward hybrid welding process, the weld zone 66 and projection 42 of the arc 56 and laser beam 34 are both caused to simultaneously travel, preferably in unison, in the direction "D" along the joint region 22.

The forward laser beam 32 and electric arc 36 form a forward molten weld pool on the surface portions 24 of the joint region 22 and within the weld seam between the faying surfaces 16 that, upon cooling to form the weldment 40, may entrap gasses generated by gas-metal reactions that evolve during welding. The entrapped gas bubbles result in the presence of porosity within the weldment 40. Though a serious limitation of prior art laser beam welding methods, a particular aspect of the invention is the ability to largely if not completely eliminate the porosity and its entrapped gases with the aft hybrid welding process, which remelts at least a portion of the weldment 40. In particular, a preferred aspect of the sequence of forward and aft hybrid welding processes is that the forward hybrid welding process produces a forward weld pool that deeply penetrates the weld seam (the region of the joint region 22 between the faying surfaces 16), which solidifies to form the weldment 40 that is then remelted by an aft weld pool produced by the aft hybrid welding process. Furthermore, the aft hybrid welding process is preferably carried out so that its aft weld pool cascades onto the weldment 40 (or onto the forward weld pool before it solidifies to form the weldment 40), resulting not only in melting of the weldment 40 but also some degree of mixing and churning of the molten weld material of the weldment 40, promoting the movement and elimination of gas bubbles that may have been initially trapped (or might have become trapped) within the weldment 40 as a result of the deep penetration and relatively rapid cooling achieved with the forward hybrid welding process and particularly its forward laser beam 32.

The electric arcs 36 and 56 utilized in the forward and aft hybrid welding processes can be generally consistent with gas-shielded fusion arc processes, including but not limited to gas metal arc welding (GMAW, also known as metal inert gas (MIG) welding), gas tungsten arc welding (GTAW, also known as tungsten inert gas (TIG) welding), flux-cored arc welding (FCAW), and gas tungsten arc welding-hot wire (GTAW-HW). Various materials can be used for the filler metal wires 48 and 68, with preferred materials depending on the compositions of the workpieces 12 and 14 and the intended application. For example, a ductile filler may be preferred to reduce the tendency for cracking in the weld joint 30, or a filler may be used whose chemistry closely matches the base metal of the workpieces 12 and 14 to more nearly maintain the desired properties of the base metal. Furthermore, the wires 48 and 68 may be solid, cored with metal powder, or cored with both metal and an appropriate flux to provide a flux/slag reaction for cleaning the resulting weld pool. According to a preferred aspect of the invention, the wires 48 and 68 can be advantageously formed of different materials. For example, the first wire 48 may be formed of a higher tensile strength material than the second wire 68, and the second wire 68 may be formed of a more ductile material than the first wire 48. As a result of the sequential forward and aft hybrid welding processes, a high strength material of the first wire 48 can be capped within the weld joint 30 by a more ductile material of the second wire 68, which in combination can lead to an increased fatigue life by increasing the number of cycles before the initiation of surface cracks.

In view of the desire for the aft weld pool produced by the aft hybrid welding process to cascade onto the weldment 40 (or, possibly, the forward weld pool) to mix and churn the molten weld material and promote the elimination of gas bubbles, the second wire 68 should be appropriately sized to produce a sufficient amount of molten weld material within the aft weld pool to achieve this effect. For this purpose, it is believed that the second wire 68 will typically be larger than the first wire 48. For example, if the first wire 48 has a diameter in a range of about 0.030 to about 0.045 inch (about 0.76 to about 1.1 mm), a larger diameter in a range of about 0.045 to about 0.093 inch (about 1.1 to about 2.4 mm) is likely to be preferred for the second wire 68. It should be appreciated that the weld prep groove 26 shown in FIG. 1 should be sized to accommodate the greater amount of weld filler metal likely to be used in the welding process as a result of using multiple filler wires 48 and 68, particularly in view of the preferred larger size of the second wire 68. The U-shaped cross-section shown for the groove 26 in FIG. 1 is also preferred for this reason. An optimal depth for the groove 26 ("$d_G$" in FIG. 1) will necessarily depend on the particular application and the depth of the weld seam (corresponding to the through-thickness of the workpieces 12 and 14).

The penetration depth of the weldment 40 and final weld joint 30 can be promoted by using at least one high-powered laser 50 as the source of one or both laser beams 32 and 34. Preferred high-powered lasers are believed to include solid-state lasers that use ytterbium oxide ($Yb_2O_3$) in disc form (Yb:YAG disc lasers) or as an internal coating in a fiber (Yb fiber lasers). Typical parameters for the high-powered laser welding process include a power level of greater than four kilowatts, for example, ten kilowatts or more, and a laser beam diameter of about 0.5 to about 1 millimeter (for example, at the projections 38 and 42). Other suitable operating parameters, such as pulsed or continuous mode of operation and travel speeds, can be ascertained without undue experimentation. Control of the laser 50 can be achieved with any suitable robotic machinery. Consistent with laser beam welding processes and equipment known in the art, the laser beams 32 and 34 does not require a vacuum or inert atmosphere. Instead, the forward and aft hybrid welding processes can be performed in any suitable atmosphere, for example, an inert shielding gas, active shielding gas, or a combination thereof to form a mixed shielding gas.

In view of the above, preferred embodiments of the welding process of this invention are able to at least partially eliminate the porosity that would otherwise result from using the laser beams 32 and 34, while allowing the laser beams 32 and 34 to provide several notable benefits. First, the laser beams 32 and 34 preferably penetrate deeply into the weld seam of the joint region 22 which, in the absence of a weld deposit during the forward hybrid welding process, enables the forward laser beam 32 to maximize the depth of the weldment 40 such that it may extend entirely through the weld seam. The forward laser beam 32 is also capable of providing a very high preheating temperature, promoting the penetration of each hybrid welding process and the cascading of the aft weld pool onto the weldment 40. In addition, the greater penetrations of the hybrid welding processes result in slower cooling rates, which have the capability of reducing residual stresses in the weld joint 30.

Because the residual heat resulting from the forward hybrid welding process and encountered by the aft hybrid welding process is dependent on the spacing distance ("$d_S$" in FIG. 1) between the laser beams 32 and 34 and between the electric arcs 36 and 56, as well as the travel rates of the beams 32 and 34 and arcs 36 and 56 along the joint region 22, forming the two separate laser beams 32 and 34 by splitting a primary laser beam is preferred in view of the difficulty of closely placing two parallel beams 32 and 34 with two separate laser beam generators. Accordingly, FIG. 1 represents a single high-powered laser 50 as generating a primary laser beam 52, which is then split by a prism 54 to create the forward and aft laser beams 32 and 34. The prism 54 also serves to align and space the beams 32 and 34 along the joint region 22, and orient the beams 32 and 34 to be parallel to each other and perpendicular to the surfaces 18 of the workpieces 12 and 14 and locally perpendicular to the surface portions 24 immediately adjacent the joint region 22. The forward laser beam 32 is preferably deep-penetrating and preheats the material immediately in front of the aft hybrid welding process. For this reason, the projections 38 and 42 of the laser beams 32 and 34 should be relatively closely spaced, as a nonlimiting example, less than 2 inches (about 5 cm) apart, separated along the joint region 22 by a distance ("$d_S$" in FIG. 1) of about 0.5 to about 1.5 inches (about 1 to about 4 centimeters). Also for the purpose of minimizing the separation distance between forward and aft hybrid welding process, the forward electric arc 36 is shown as being angled back toward the aft hybrid welding process and the aft electric arc 56 is shown as being angled forward toward the forward hybrid welding process. In some situations, it may also be preferable for the forward laser beam 32 to be at a higher power level than the aft laser beam 34, and/or to be more focused to have a smaller diameter than the aft laser beam 34.

In use, the welding apparatus 10 represented in FIG. 1 is operated to weld the workpieces 12 and 14 by projecting the laser beam 32 and electric arc 36 of the forward hybrid welding process onto the joint region 22 to melt the shim 28, penetrate the weld seam between the faying surfaces 16 of the workpieces 12 and 14, and create a forward molten pool that solidifies to form the weldment 40 in which porosity may be present. Subsequently, the weldment 40 is remelted by the laser beam 34 and electric arc 56 of the aft hybrid welding process, forming an aft molten weld pool that cascades onto the weldment 40 and, as a result, contains molten base metal from the workpieces 12 and 14 as well as molten filler metals from the wires 48 and 68. Prior to solidification of this weld pool to form the weld joint 30, gas bubbles originally trapped within the weldment 40 preferably float upward through the weld pool and are released. On cooling, the workpieces 12 and 14 are metallurgically joined by the weld joint 30, which preferably extends entirely through the through-thickness of the resulting welded assembly. While the weld joint 30 depicted in FIG. 1 is a square groove butt joint, it should be understood that other joint types are foreseeable, including corner joints, lap joints, edge joints, and tee joints.

Reducing or eliminating porosity in the deep weld joint 30 promotes weld metal properties that are capable of achieving longer lives for components subjected to fatigue as a result of cyclic operating conditions. As previously noted, a commercial example is the fabrication of wind turbine towers used in power generation. Currently, certain wind turbine towers are fabricated with weld joints formed by submerged arc welding (SAW), requiring six to twelve welding passes at speeds of about twenty to forty inches per minute (about 50 to 100 cm/minute). With the present invention, it is believed that equivalent and potentially superior weld joints can be produced in a single pass at speeds of about 100 to 200 inches per minute (about 2500 to 5000 cm/minute). Prior to the present invention, laser beam welding of such structures would have been discouraged because of significant amounts of fine internal porosity formed when attempting to laser beam weld sections with thicknesses greater than about one-half inch (about one centimeter).

While the invention has been described in terms of a preferred embodiment, it is apparent that other forms could be adopted by one skilled in the art. Accordingly, the scope of the invention is to be limited only by the following claims.

The invention claimed is:

1. A method of welding at least two workpieces together by metallurgically joining faying surfaces of the workpieces, the method comprising:

placing the workpieces together so that the faying surfaces thereof face each other and a joint region is defined, the joint region comprising an intersurface portion defined by and between the faying surfaces and immediately adjacent surfaces of the workpieces that remain exposed after the workpieces are placed together;

conducting forward and aft hybrid welding processes in sequence along the joint region, the forward hybrid welding process comprising projecting a forward laser beam onto the joint region to cause a projection of the forward laser beam to travel along the joint region and penetrate the intersurface portion of the joint region and further comprising directing a forward electric arc onto the projection of the forward laser beam while feeding a first weld filler material into the forward electric arc to form a forward weld pool that solidifies to form a weldment in the joint region, the aft hybrid welding process comprising projecting an aft laser beam onto the weldment to cause a projection of the aft laser beam to travel along and penetrate the weldment and further comprising directing an aft electric arc onto the projection of the aft laser beam while feeding a second weld filler material into the aft electric arc to form an aft weld pool, the forward and aft laser beam projections being spaced apart along the joint region and the forward and aft electric arcs being spaced apart along the joint region so as to cause the aft weld pool formed by the aft hybrid welding process to cascade onto, remelt and intermix with the weldment to form a combined weld pool; and then cooling the combined weld pool to form a weld joint within the joint region that metallurgically joins the workpieces to yield a welded assembly.

2. The method according to claim 1, wherein the aft laser beam is at a power level greater than the forward laser beam.

3. The method according to claim 1, wherein the forward and aft laser beams penetrate the intersurface portion of the joint region and the aft laser beam penetrates the intersurface portion to a lesser depth than the forward laser beam.

4. The method according to claim 1, wherein the first weld filler material has a cross-sectional area greater than a cross-sectional area of the second weld filler material.

5. The method according to claim 1, wherein the first and second weld filler materials are formed of different materials.

6. The method according to claim 5, wherein the material of the first weld filler material has a higher tensile strength than the material of the second weld filler material.

7. The method according to claim 5, wherein the material of the second weld filler material is more ductile than the material of the first weld filler material.

8. The method according to claim 1, wherein the first and second laser beams are separated along the joint region by a distance of less than 5 centimeters.

9. The method according to claim 1, wherein the first and second laser beams are separated along the joint region by a distance of about 1 to about 4 centimeters.

10. The method according to claim 1, wherein the first and second laser beams are parallel to each other.

11. The method according to claim 10, wherein the first and second laser beams are perpendicular to the adjacent surfaces of the workpieces.

12. The method according to claim 10, wherein the first and second laser beams are created by splitting a primary laser beam.

13. The method according to claim 1, further comprising placing a shim between the workpieces so that the faying surfaces contact the shim, the shim is within the intersurface portion of the joint region, and the shim is melted by the forward hybrid welding process.

14. The method according to claim 1, wherein the intersurface portion and the weld joint extend at least one centimeter beneath the adjacent surfaces of the workpieces.

15. The method according to claim 1, wherein the weld joint extends entirely through the intersurface portion of the joint region.

16. The method according to claim 1, wherein the electric arc is generated by a gas-shielded fusion arc welding process.

17. The method according to claim 1, wherein the weldment solidifies and entraps gas bubbles therein, and gases within the bubbles are released from the weldment as a result of the weldment being remelted by the aft weld pool formed by the aft laser beam and the aft electric arc.

18. The method according to claim 1, wherein the welded assembly is a power generation, aerospace, infrastructure, medical, or industrial component.

19. The method according to claim 1, wherein the welded assembly is a component of a wind turbine tower.

20. An apparatus for welding at least two workpieces together by metallurgically joining faying surfaces thereof that face each other to define a joint region comprising an intersurface portion defined by and between the faying surfaces and immediately adjacent surfaces of the workpieces that remain exposed, the apparatus comprising:

means for welding the workpieces together by performing forward and aft hybrid welding processes in sequence along the joint region, the welding means comprising means for conducting the forward hybrid welding process on the joint region and means for conducting the aft hybrid welding process on a weldment formed by the forward hybrid welding process;

the forward hybrid welding process means being adapted to project a forward laser beam onto the joint region and cause a projection of the forward laser beam to travel along the joint region and penetrate the intersurface portion of the joint region, the forward hybrid welding process means being further adapted to direct a forward electric arc onto the projection of the forward laser beam while feeding a first weld filler material into the forward electric arc to form the weldment in the joint region;

the aft hybrid welding process means being adapted to project an aft laser beam onto the weldment and cause a projection of the aft laser beam to travel along and penetrate the weldment, the aft hybrid welding process means being further adapted to direct an aft electric arc onto the projection of the aft laser beam while feeding a second weld filler material into the aft electric arc to form an aft weld pool;

the welding means spacing the forward and aft laser beam projections apart along the joint region and spacing the forward and aft electric arcs apart along the joint region so as to cause the aft weld pool formed by the aft hybrid welding process means to cascade onto, remelt and intermix with the weldment to form a combined weld pool.

* * * * *